(12) United States Patent
Yoo et al.

(10) Patent No.: US 7,255,952 B2
(45) Date of Patent: Aug. 14, 2007

(54) SOLID OXIDE FUEL CELLS HAVING GAS CHANNEL

(75) Inventors: Young Sung Yoo, Daejeon (KR); Hee Chun Lim, Daejeon (KR); Jin Woo Park, Daejeon (KR); Sang Hyoun Park, Cheonan-si (KR)

(73) Assignee: Korea Electric Power Corporation (KR)

( * ) Notice: Subject to any disclaimer, the term of this patent is extended or adjusted under 35 U.S.C. 154(b) by 196 days.

(21) Appl. No.: 10/694,695

(22) Filed: Oct. 27, 2003

(65) Prior Publication Data

US 2004/0091766 A1   May 13, 2004

(30) Foreign Application Priority Data

Oct. 28, 2002   (KR) ............... 10-2002-0065923

(51) Int. Cl.
*H01M 2/00*   (2006.01)
*H01M 8/10*   (2006.01)

(52) U.S. Cl. .......................................... 429/34; 429/30

(58) Field of Classification Search ............ 429/38, 429/44, 30, 33, 34, 39
See application file for complete search history.

(56) References Cited

U.S. PATENT DOCUMENTS 5,368,951 A * 11/1994 Shiratori et al. ............. 429/30
6,593,020 B1 * 7/2003 Yoo et al. .................... 429/33

* cited by examiner

*Primary Examiner*—Mark Ruthkosky
*Assistant Examiner*—Thomas H. Parsons
(74) *Attorney, Agent, or Firm*—Cantor Colburn LLP

(57) ABSTRACT

The solid oxide fuel cell according to the present invention is directed to a support type or self-support type single cell in which four sides or opposite two sides of corners of the single cell are downwardly bent in an inverted U shape and have gas channels in the inner side and/or outer side with a straight line structure or lattice shape structure, so that a separating plate can be used without gas channels or channel support. A smooth flow of a reaction gas is implemented in the directions of the air electrode and the fuel electrode of a single cell.

9 Claims, 10 Drawing Sheets

SOLID OXIDE FUEL CELLS HAVING GAS CHANNEL

BACKGROUND OF THE INVENTION

1. Field of the Invention

The present invention relates to a solid oxide fuel cell having gas channel and particularly to a solid oxide fuel cell having gas channels which is implemented in an electrode support type or electrolyte support type of which four sides or opposite two sides of corners of a single cell are downwardly bent in an inverted U shape and have gas channels inside and/or outside the single cell.

2. Description of the Background Art

A fuel cell is an energy generation apparatus in which a fuel gas and air are injected to a anode and an cathode, respectively. An ionic conduction is performed through an electrolyte, and an electrochemical reaction is performed in the fuel cell. Electricity is continuously obtained provided that fuel and air are provided under certain conditions based on the characteristics of an electrode and electrolyte of the fuel cell as an electron conduction is proceeded through an external circuit.

The fuel cell is a power generation apparatus with relatively high efficiency and produces relatively small amount of pollutant. There are various operating temperatures, electrode materials and applications depending on the kinds of electrolytes.

In a Solid Oxide Fuel Cell (SOFC) referred to as an advanced fuel cell, an oxygen or hydrogen ionic conduction in a direction of a dense solid electrolyte layer is obtained based on a smooth flow of a reaction gas in a direction of an end cell electrode, an electrical contact with a separating plate, and a dense sealing between two kinds of reaction gases. In the SOFC, an electromotive force produced through an electrochemical reaction in the electrode layers is used for generating power.

Particularly, the SOFC uses a thermochemically stable metallic oxide as an electrolyte. A fuel gas such as hydrogen, methane, propane, butane, etc. may be used without reforming into a fuel electrode and air gas at an air electrode which are provided in the SOFC.

In well known solid oxide fuel cell materials, a mixture of Ni and YSZ cermet is used as a fuel electrode. One or more powder selected from a group consisting of $ZrO_2+8Y_2O_3$ group, $CeO_2$ group, $Bi_2O_3$ group, and perovskite group is used as an electrolyte. Also $LaSrMnO_3$ (LSM) is used as an air electrode. $Cr-5Fe-1Y_2O_3$, Ni base metal, stainless steel, or $LaSrCrO_3$ is used as a separating plate or an interconnect. A glass or glass-ceramic is used as a sealant. The above materials are stacked with each other and coupled with other peripherals. Therefore, the whole power generation system is constituted.

The above described single cell has a fuel electrode (cathode) in one side and an air electrode (anode) in the other side with respect to the electrolyte. Each electrode layer is designed to have a porous structure for implementing easier electrochemical reaction. The intermediate layer corresponding to an electrolyte is designed to have a dense structure in which a fuel gas and an oxide gas(air) are not communicated with each other.

A tube type and a flat plate type are developed in the SOFC based on the type of a single cell. The tube type is first developed, but there is a problem for actually adapting it on lower cost SOFC because a production method is not easy. Referring to FIG. 1A, in the flat plate type, a separating plate 8 is generally used, thus separating a fuel gas and an oxide gas, and the separated gas is provided to a single cell 4. The separating plate 8 has a small electrical resistance in order for the generated electricity to be conducted well.

Referring to FIG. 1B, when a system is manufactured in a stack structure, a flat type single cell is provided between the separating plates, and a sealant or a sealing glass is provided between the separating plates in order for two gases to flow through both channels of the separating plate not to be mixed with each other. A gas supply must be smoothly performed in the electrode layers at both sides of the single cell. Particularly, the remaining portions in which the single cell and the separating plate are not contacted must be sealed in an insulation layer structure or a plate shape formed of a certain material having certain sealing and insulation properties, for example, ceramic glass.

Metal and ceramic materials are used as a material of the separating plate. Particularly, the materials must have good electrical conductivity and good gastight sealing property. The materials must have an anti-oxidation property at a certain operation temperature of a solid oxide fuel cell in the range of, for example, from about 400. to about 1000° C. for the reasons that the reaction gas may be separated with respect to the separating plate and may be supplied to the single cell in a state that the hydrogen which is a fuel gas is separated in the side of the fuel electrode (upper surface in the separating plate), and the air which is an oxidizing agent is separated in the side of the air electrode of the single cell (lower surface in the separating plate). Therefore, it is advantageous to use the metallic separating plate for actually using the SOFC power generation system rather than using the ceramic material which is not produced easily and expensive. As the temperature and the operating time are increased, the surface of the metallic separating plate at the side of air electrode is oxidized, so that the performance of the stack is decreased. As a result, the durability of the system is decreased.

The metallic separating plate is widely used for developing the SOFC stack of an intermediate temperature (from about 500. to about 850° C.) because there are many advantages that the metallic separating plates may be produced in various types compared to the ceramic materials. However, in case of the SOFC stack, the thermal expansion coefficient of metallic separating plate has a large value 1.2 through 2 times the thermal expansion coefficient (about $10 \times 10^{-6}/°C.$) of the single cell at which the SOFC operates, so that a larger thermal stress occurs as the temperature is changed from a room temperature to a high temperature or from a high temperature to a room temperature in a temperature change (namely, thermal cycle) when turning on or off the SOFC power generation apparatus. Recently, as a single cell having an excellent performance is developed based on the SOFC technology, the same performance as the conventional method is achieved at a relatively low temperature (intermediate temperature). Therefore, the metallic separating plate is more widely used compared to ceramic materials.

The separating plate formed of a metallic material or a ceramic material is generally formed in a channel structure for implementing a desired electrical contact with a smooth gas flow of injected reaction gas. Particularly, the ceramic material is formed based on a press compaction method. The production process is not complicated, but in the case of the metallic separating plate, it is produced based on a machining method, not based on the press compaction method. Therefore, it takes a long time for producing the gas channel which is a necessary structure in the fuel cell. In this case, the production cost of the separating plate and the whole production cost of the SOFC stack increase.

FIGS. 2A and 2B are showing the construction of a single cell (FIG. 2A) in which four sides or opposite two sides of corners of a rectangular single cell in U.S. patent application Ser. No. 09/522,284 (now U.S. Pat. No. 6,593,020, earlier filed by the same inventor as the present application) are bent in an inverted U shape and a stack construction (FIG. 2B) of a manifold type produced by using such a cell. The stack structure 11 includes a single cell 4, a gas channel 6, a channel support 7, separating plates 8 and 9, a porous insulating plate 10, a sealant groove 12, a first collector 14, a second collector 13, and as manifolds 15.

In the single cell and stack construction of FIGS. 2A and 2B, the fuel cell stack is produced in such a manner that the channel support 7 is provided between the grooves with the gas channel 6 on the separating plate 8, and the single cell 4 is coupled. The single cell 4 and the separating plate 8 are sealed using the porous insulation plate 10, namely, using a ceramic insulation felt and a sealing glass, for smoothing a sealed portion using the sealant groove 12 in the single cell 4 and the separating plate 8 and for preventing thermal stress. The above elements are coupled each other in the above sequence. The single cell and the above elements are finally stacked in vertical direction based on a necessary voltage for thereby producing the fuel cell stack.

It is possible to achieve an improved sealing condition by inserting sealant based on sufficient space (sealing groove) in which the portions needing a gastight sealing are separated, referring to FIGS. 2A and 2B, compared to the method of FIG. 1 in which the flat plate type single cell is simply used. Therefore, since the sealing function is improved, the entire stacks may be heated or cooled, so that a desired thermal cycle property is obtained. A certain stack structure having a good durability is implemented.

However, in the case that the stack of FIG. 2B is produced using the single cell of FIG. 2A, the channel structures of the channel support 7 and the separating plate 8 are additionally provided. In the above separating plate, the production cost of the separating plate may be increased due to the above channel structures, and the production cost of the SOFC stack is increased. Therefore, it is needed to provide the single cell 4 of FIG. 2B with a channel structure during the molding process, so that it is possible to directly use a separating plate formed in a simple plate shape which does not have a channel structure of a fuel electrode or air electrode during a stack production. Therefore, a relatively lower cost separating plate may be obtained when producing a SOFC stack.

SUMMARY OF THE INVENTION

Accordingly, it is an object of the present invention to provide a solid oxide fuel cell having gas channels in an inner and/or outer side of a single cell.

It is another object of the present invention to provide a solid oxide fuel cell in which a low cost separating plate is available because channel of a fuel electrode or an air electrode is not used in a separating plate when producing a SOFC stack.

It is another object of the present invention to provide a solid oxide fuel cell by which thickness of a separating plate may be reduced because channels of a fuel electrode or an air electrode is not needed in a separating plate when producing a SOFC stack.

It is still another object of the present invention to provide a solid oxide fuel cell by which a stack having higher output and the same size stack as the conventional art may be produced for a SOFC stack.

It is further another object of the present invention to provide a solid oxide fuel cell which is capable of enhancing a life span of a single cell by enhancing a high temperature creep resistance in a fuel electrode or an air electrode which is an element having gas channels corresponding to a long time performance of a single cell.

To achieve the above and another objects, it is provided that a single cell for a solid oxide fuel cell includes a fuel electrode, an electrolyte, and an air electrode, in which four sides or opposite two sides of corners are downwardly bent in an inverted U shape, and a gas channel is formed in an inner side and/or an outer side of the single cell.

The single cell of the present invention relates to an electrode self-support type structure in which an electrolyte is coated by a thickness of about 5 µm through about 50 µm in a porous fuel electrode or an air electrode support in which four sides or opposite two sides of corners are downwardly bent in an inverted U shape or directed to having a structure in which the same cross sections are downwardly bent by a thickness of about 50 µm through about 2000 µm, or in a triple layer structure or a multiple layer structure in which a porous air electrode and a fuel electrode are coated in an upper portion and/or a lower portion, and gas channels are formed in an inner side and/or an outer side.

When using the single cell according to the present invention, it is not necessary to perform a channel machining process in one side or all sides of the separating plate. It is also not necessary to use the channel machining processes in the channel support and the separating plate used for stacking the single cells in which four sides or opposite two sides of corners are downwardly bent in an inverted U shape in the conventional art.

BRIEF DESCRIPTION OF THE DRAWINGS

The present invention will become better understood with reference to the accompanying drawings which are given only by way of illustration and of the present invention is not limited to the exemplary embodiments shown in the drawings, wherein.

DETAILED DESCRIPTION OF THE INVENTION

The exemplary embodiments of the present invention will be described with reference to the accompanying drawings.

Figure 3A:
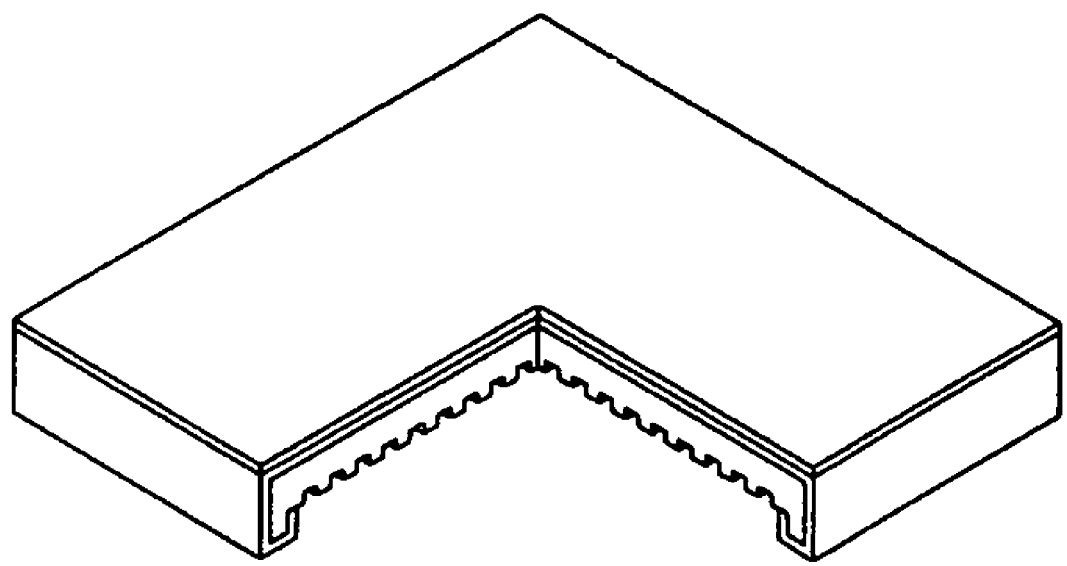
FIGS. 3A to 3D are perspective views showing a single cell having reaction gas channels with a straight line structure or a lattice shape structure in a fuel electrode support of a single cell in which four sides or opposite two sides of corners of a rectangular cell are downwardly bent in an inverted U shape according to the present invention.
Figure 3B:
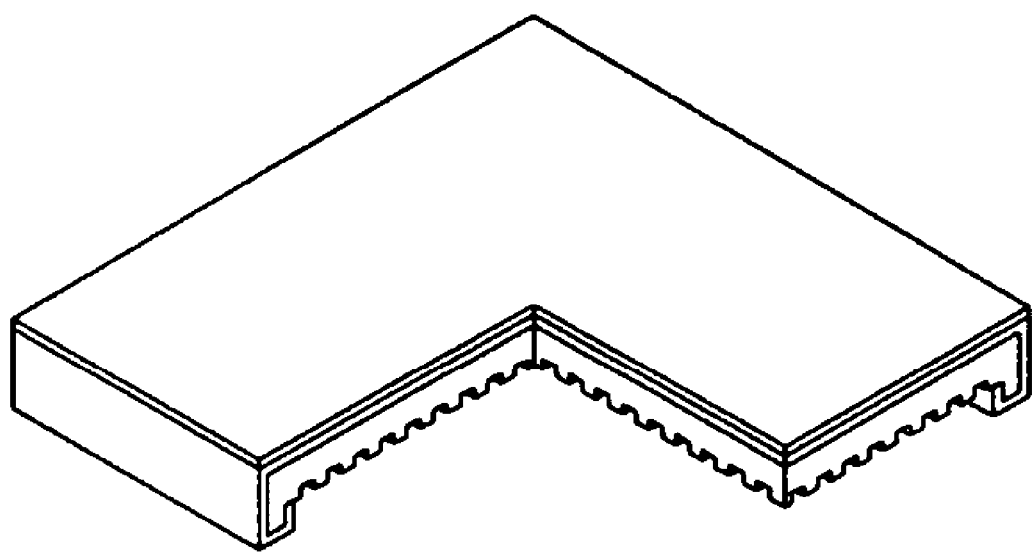
Figure 3C:
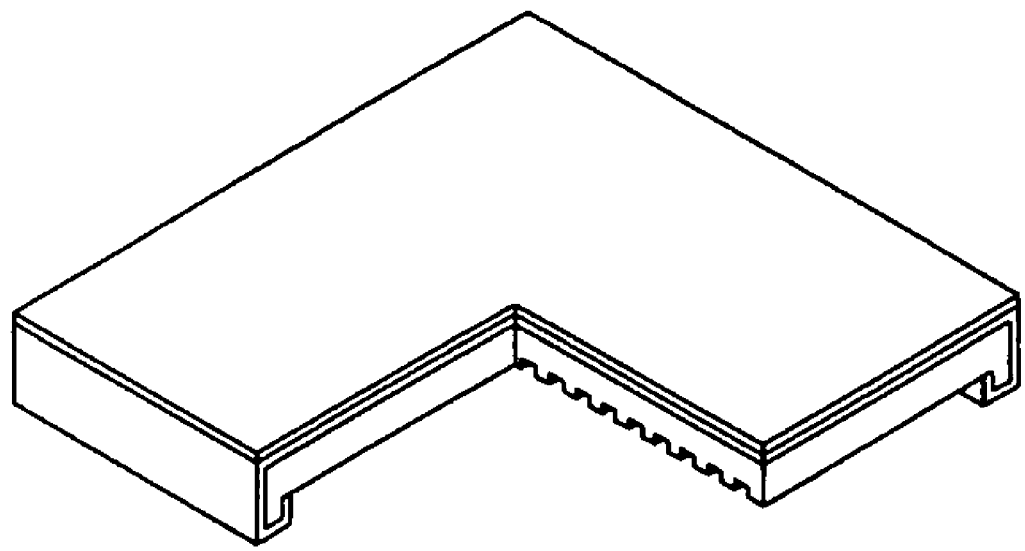
Figure 3D:
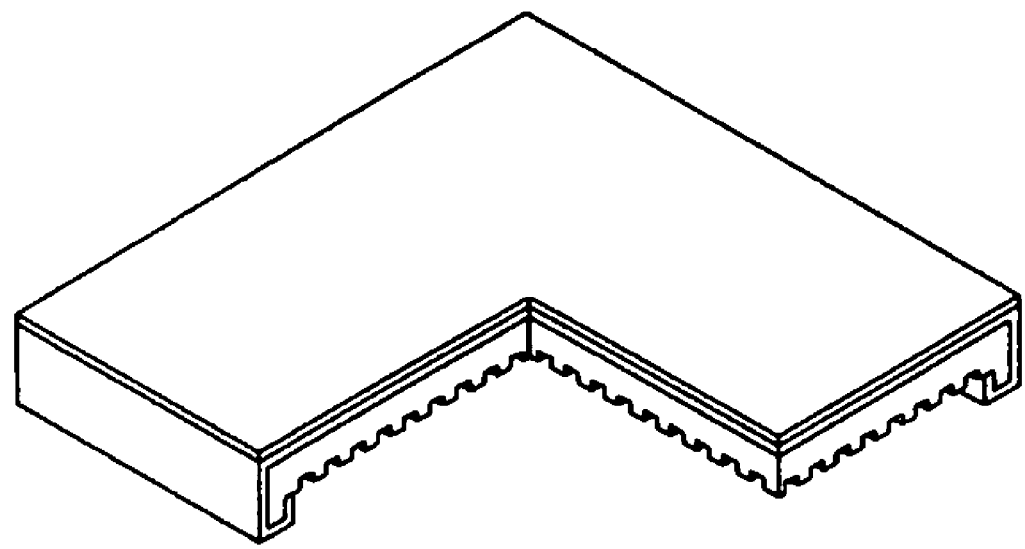

FIGS. 3A to 3D are perspective views showing a single cell having reaction gas channels in a support of a single cell in which the four sides or opposite two sides of corners of a rectangular single cell according to the present invention are downwardly bent in an inverted U shape. In particular, FIG. 3A is a view showing a straight line structure of reaction gas channels in a fuel electrode support as a fuel electrode support type single cell of which four sides are downwardly bent in an inverted U shape, FIG. 3B is a view showing a lattice type structure of reaction gas channels in a fuel electrode support as a fuel electrode support type single cell of which four sides of the same are downwardly bent, FIG. 3C is a view showing a straight line structure of a reaction gas channels in an electrode fuel support as a fuel electrode support type unit in which the cross sections of opposite two sides are downwardly bent in an inverted U shape, and FIG. 3D is a view showing a lattice type structure of reaction gas channels in a fuel electrode support as a fuel electrode support type single cell in which the cross sections of opposite two sides are downwardly bent in an inverted U shape.

Figure 4A:
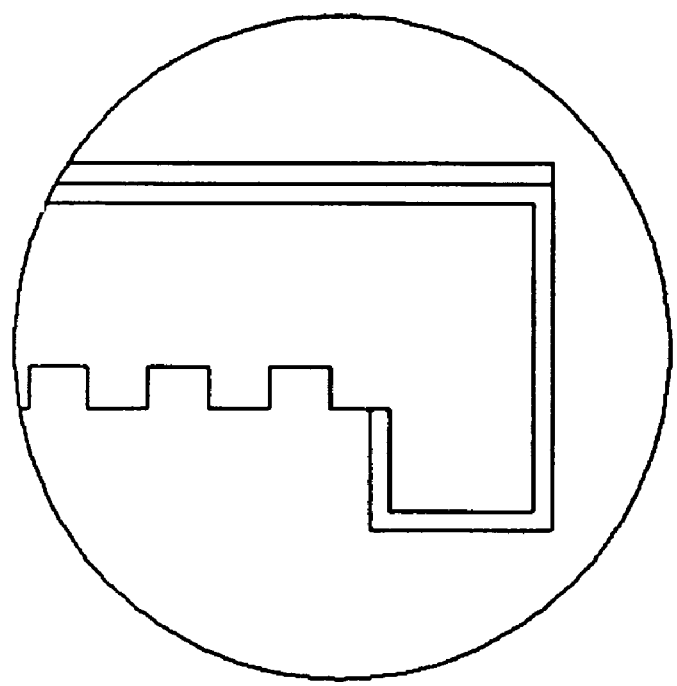
FIGS. 4A and 4B are perspective views showing the construction that a bent portion of each support is entirely or partially surrounded in the single cell of FIG. 3.
Figure 4B:
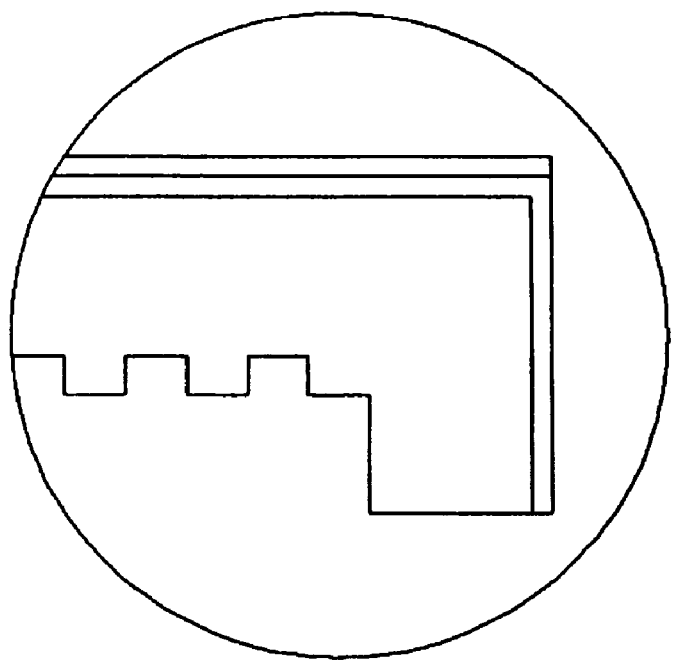

FIGS. 4A and 4B are perspective views of a 2-dimensional cross section of a bent portion in each single cell of FIGS. 3A through 3D, in which FIG. 4A is a view showing the construction that the entire portions of the bent portion of the support are surrounded by an electrolyte, and FIG. 4B is a perspective view showing the construction that a part of the bent portion of the support is surrounded by the electrolyte.

Figure 5A:
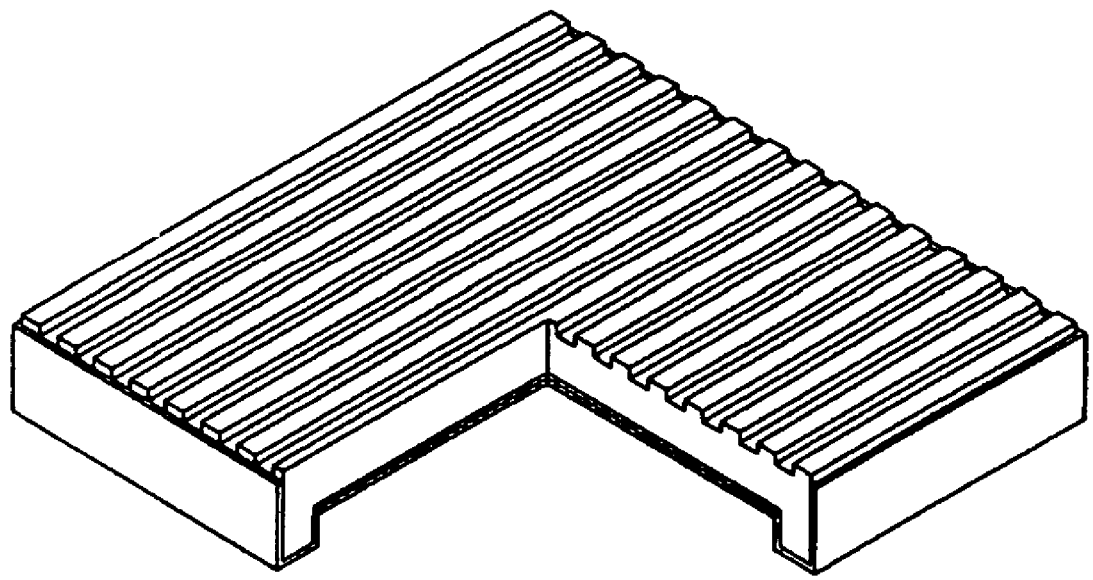
FIGS. 5A to 5D are perspective views showing a single cell having reaction gas channels with a straight line structure or a lattice shape structure in an air electrode support of a single cell in which four sides or opposite two sides of corners of a rectangular cell are downwardly bent in an inverted U shape according to the present invention.
Figure 5B:
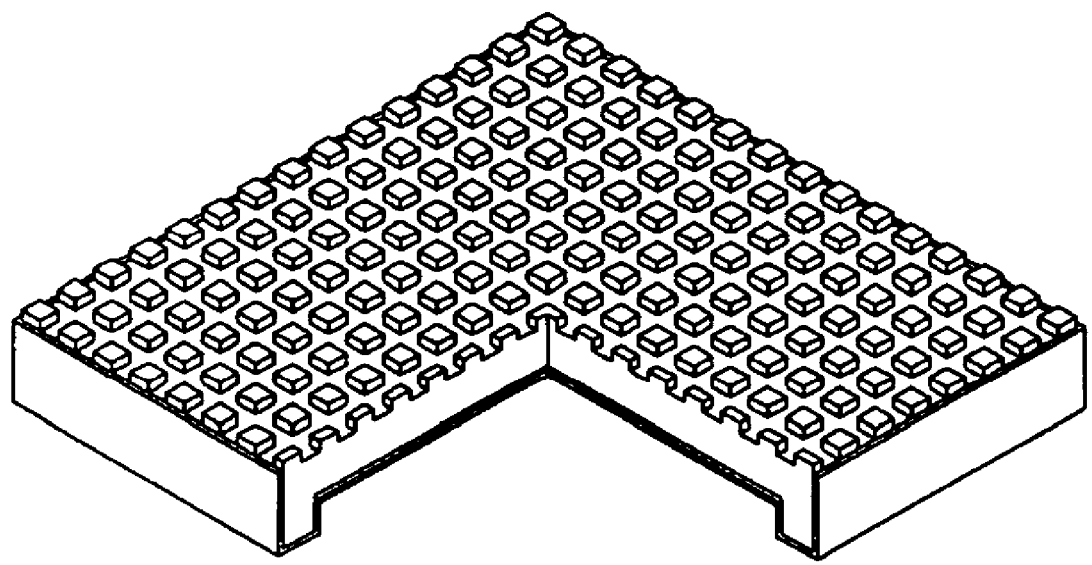
Figure 5C:
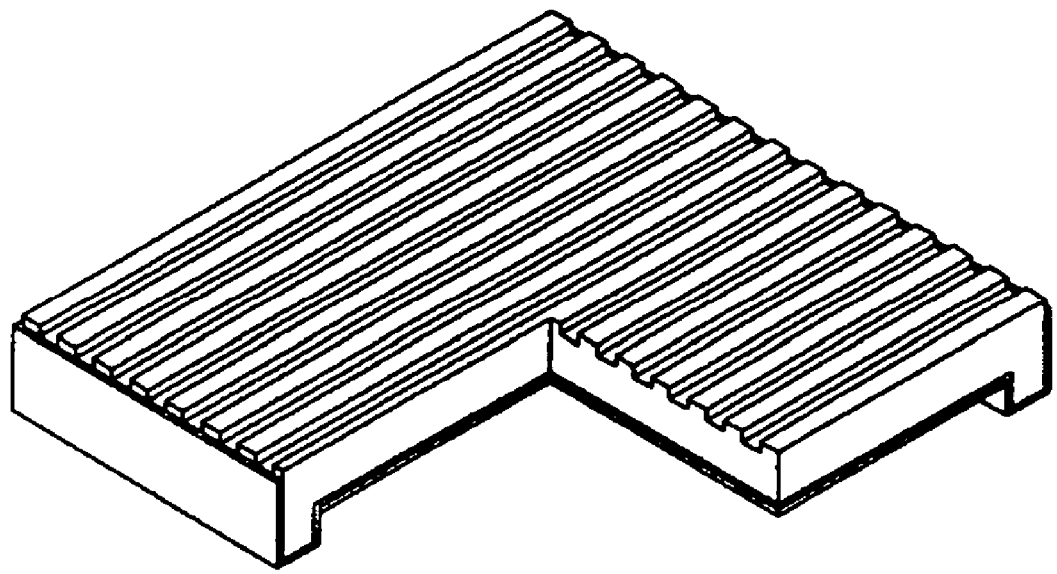
Figure 5D:
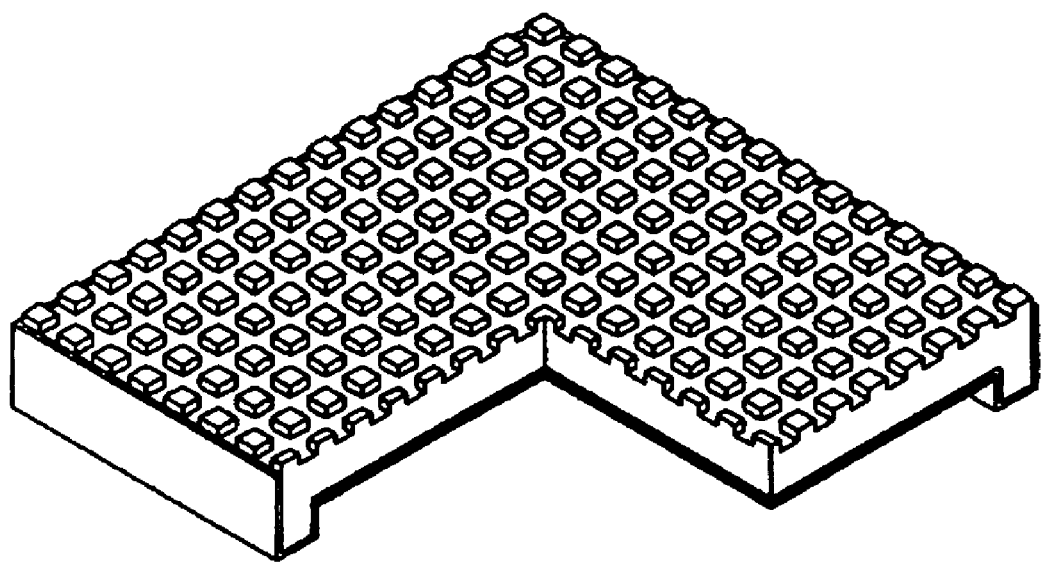

FIGS. 5A through 5D are perspective views showing the single cells each having reaction gas channels in an air electrode support of a single cell in which four sides or opposite two sides of corners of a rectangular single cell are downwardly bent in an inverted U shape. In particular FIG. 5A is a view showing a single cell having reaction gas channels formed in a straight line structure as an air electrode support type single cell in which four sides are downwardly bent in an inverted U shape, and FIG. 5B is a view showing a single cell having reaction gas channels in a lattice shape as an air electrode support type single cell in which four sides are downwardly bent, and FIG. 5C is a perspective view showing a single cell having reaction gas channels in a straight line structure as an air electrode in which the cross sections of the opposite two sides are downwardly bent in an inverted U shape, and FIG. 5D is a view showing a single cell having a reaction gas channel in a lattice shape structure as an air electrode support type single cell in which the cross sections of the opposite two sides are downwardly bent in an inverted U shape.

Figure 6A:
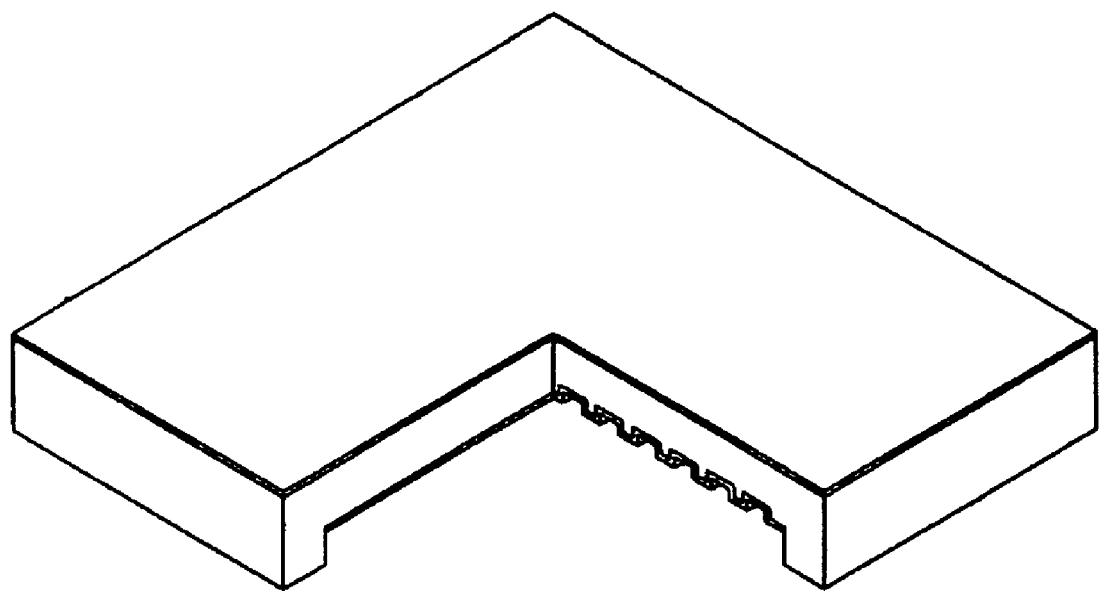
FIGS. 6A to 6D are perspective views showing a single cell having reaction gas channels with a straight line structure or a lattice shape structure in an electrolyte support of a single cell in which four sides or opposite two sides of corners of a rectangular cell are downwardly bent in an inverted U shape according to the present invention.
Figure 6B:
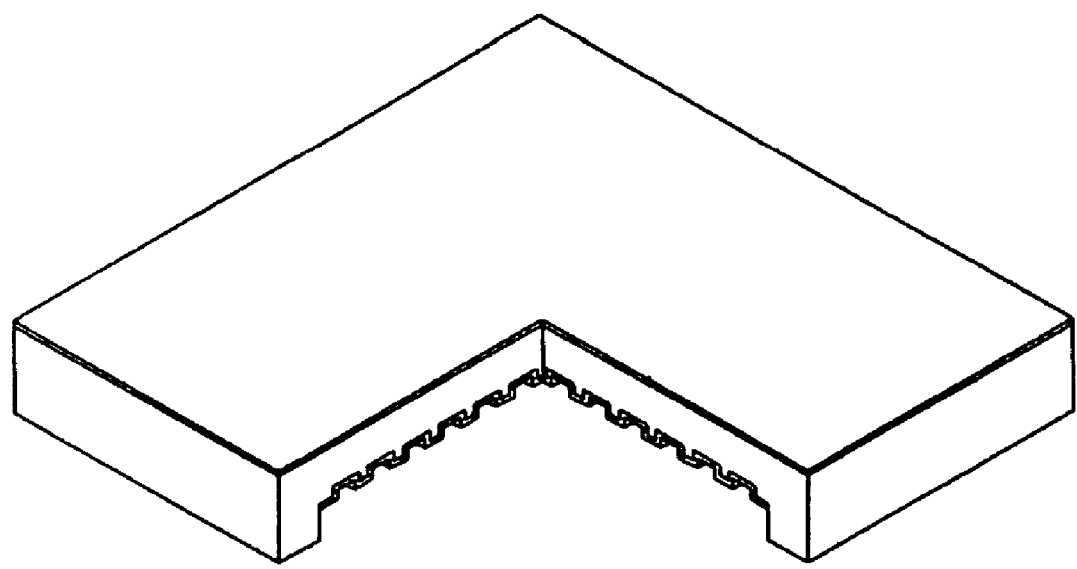
Figure 6C:
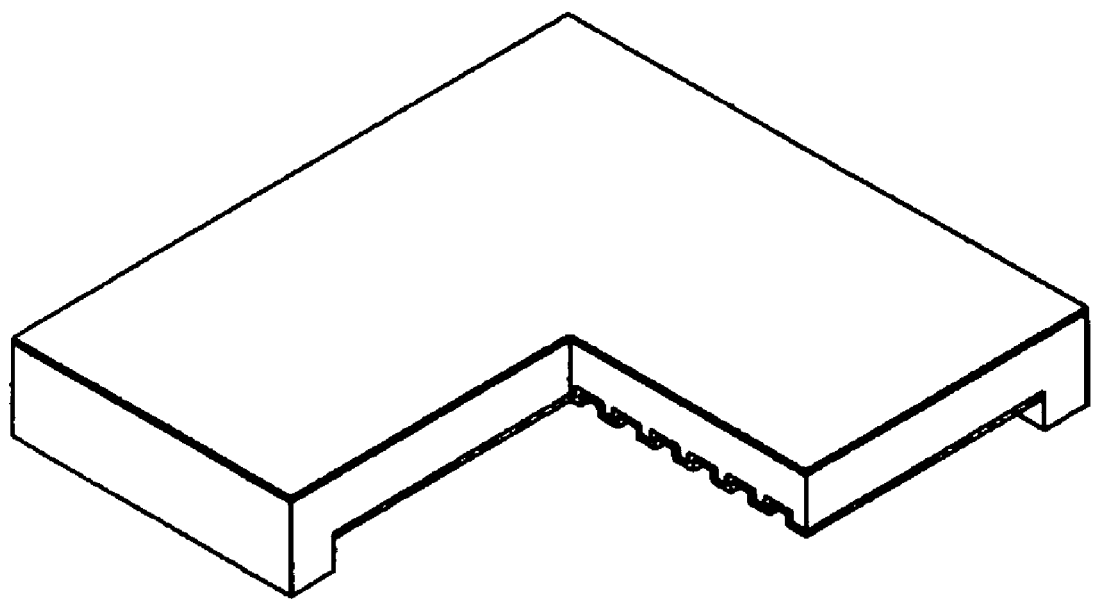
Figure 6D:
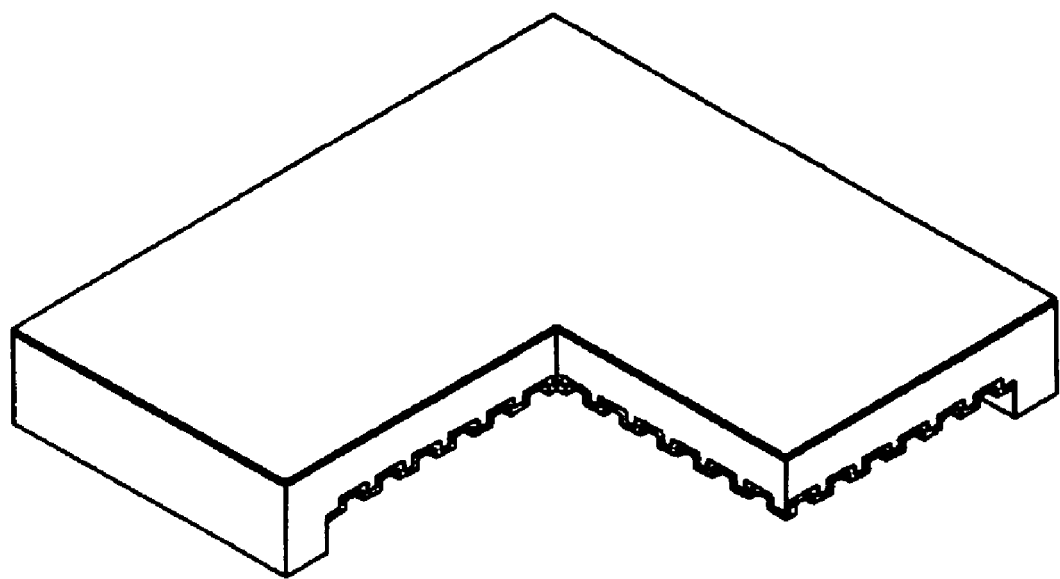

FIGS. 6A through 6D are perspective views each showing a single cell having reaction gas channels in an electrolyte of a single cell in which four sides or opposite two sides of corners of a rectangular single cell according to the present invention are downwardly bent in an inverted U shape. In particular FIG. 6A is a view showing a single cell having a straight line structure of reaction gas channels in electrolyte gas channels as an electrolyte support type single cell in which the four sides are downwardly bent in an inverted U shape, FIG. 6B is a view showing a single cell having a lattice shape structure of reaction gas channels in an electrolyte support as an electrolyte support type single cell in which four sides are bent in an inverted U shape, FIG. 6C is a view showing a single cell having a straight line structure of a reaction gas channel in an electrolyte support as an electrolyte support type single cell in which the cross sections of the opposite two sides are downwardly bent in an inverted U shape, and FIG. 6D is a view showing a single cell having a lattice shape structure of reaction gas channels in an electrolyte support as an electrolyte support type single cell in which the cross sections of the opposite two sides are downwardly bent in an inverted U shape.

The exemplary embodiments of the present invention will be described in more detail with reference to the accompanying drawings.

EXAMPLE 1

Figure 2A:
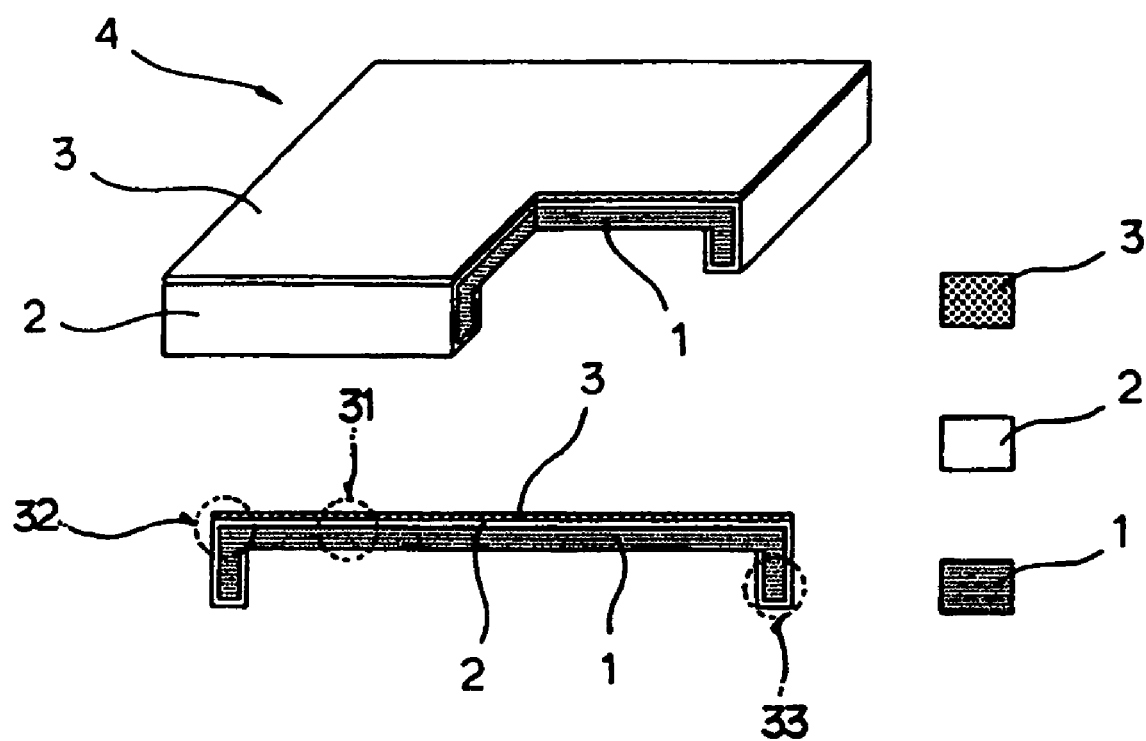
FIGS. 2A and 2B are perspective views showing a single cell in which four sides or opposite two sides of corners of a conventional rectangular single cell are downwardly bent in an inverted U shape and a stack construction of an inner manifold type produced using single cells.
Figure 2B:
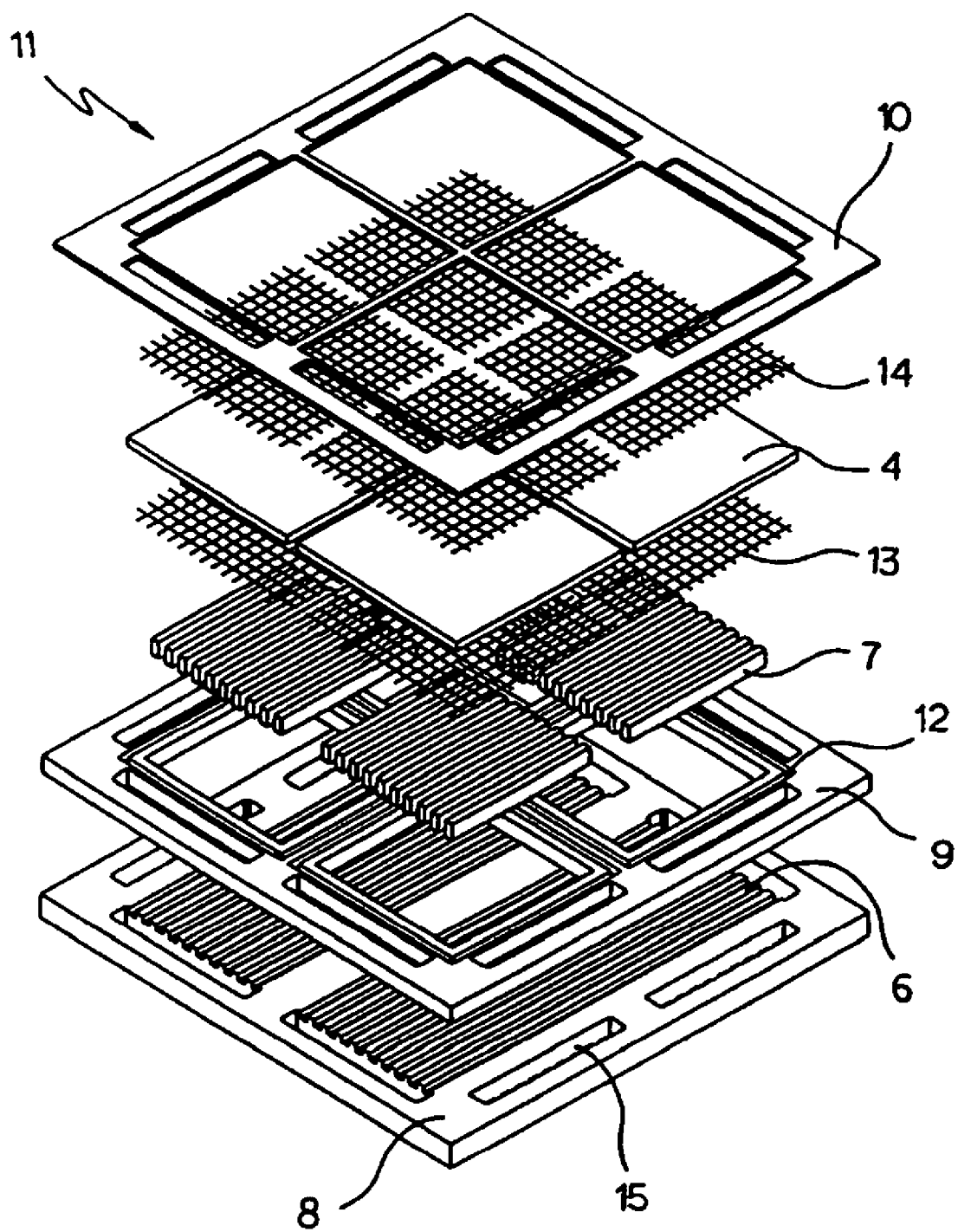

Fuel Electrode Support Type Single Cell Having Reaction Gas Channels in which Four Sides or Opposite Two Sides of Corners are Downwardly Bent in an Inverted U Shape Referring to FIG. 2A, the bent type single cell 4 of a channel structure is directed to a single cell in which four sides or opposite two sides of corners of the flat plate 31 are downwardly bent in an inverted U shape, and there is provided a channel for implementing a smooth flow of a fuel gas in a relatively thick fuel electrode support.

The above single cell 4 is a triple layer single cell which is formed of a porous fuel electrode 1 having a bent portion 32 and a support 33 and a thickness of about 1 mm through about 2 mm, an electrolyte 2 coated on the upper side of the support 33 and the entire portions of corners using a thin film having a thickness of about 5 μm through about 50 μm, and an air electrode on the upper side of the electrolyte 2. Namely, the electrolyte 2 is provided in the center of the single cell 4, and the fuel electrode 1 is provided in the lower side, and the air electrode 3 is provided in the upper side.

At this time, the final single cell may be formed in the structure of FIGS. 3A through 3D. For example, the final single cell has a size of about 50×50 mm, a thickness of about 1.7 mm, a height of the downwardly bent corner portion of about 3.5 mm, and a width wise thickness of the bent portion of about 2 mm.

The single cell is produced in such a manner that one or more electrolytes selected from $ZrO_2$, $CeO_2$, $Bi_2O_3$, and lanthanum perovskite groups are coated on a fuel electrode support which is a first sintering material using a known slurry coating method and an electrochemical vapor deposition method. A resultant material is heat-treated one time or multiple times at about 1250° C., and the resultant material is sintered at about 1450° C. through about 1600° C., for thereby producing a dense electrolyte layer having a thickness of about 5 μm through about 50 μm.

Here, referring to FIG. 4A, the entire bent portions may be surrounded by the dense electrolyte layer, and referring to FIG. 4B, the dense electrolyte layer may be coated on the upper portions of the fuel electrode and the corner side surfaces of the bent portion of the support. It is possible to prevent a direct leakage of a fuel gas from the porous support during the operation of the SOFC, and a sealing effect is enhanced.

Each bent portion and the channel structure, for example, a straight line structure or lattice structure, may be changed in various forms of structures. Namely, in the straight line structure, the structure may have an obtuse angle, not a simple right angle, or may be formed in a trapezoid combined with acute angles. In the lattice structure, the protrusion may be changed in various shapes, for example, to a rectangular shape, a polygonal shape or a circular shape.

The air electrode is screen-printed using a paste of a LSM ($La_{0.85}Sr_{0.15}MnO_3$)+YSZ including graphite powder of about 20% on an upper surface of the electrolyte layer and is dried and heat-treated at about 1100° C. for thereby producing a SOFC single cell of a fuel electrode support type of a triple structure.

Figure 1A:
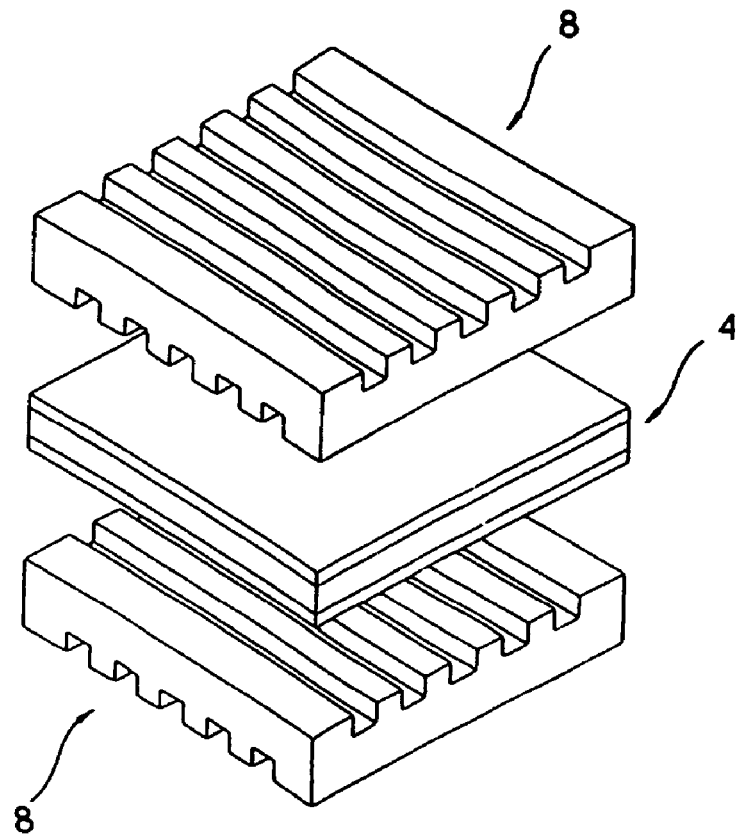
FIGS. 1A and 1B are perspective views showing a SOFC single cell of a conventional flat self-support structure and a stack construction of a lattice array method produced using single cells.
Figure 1B:
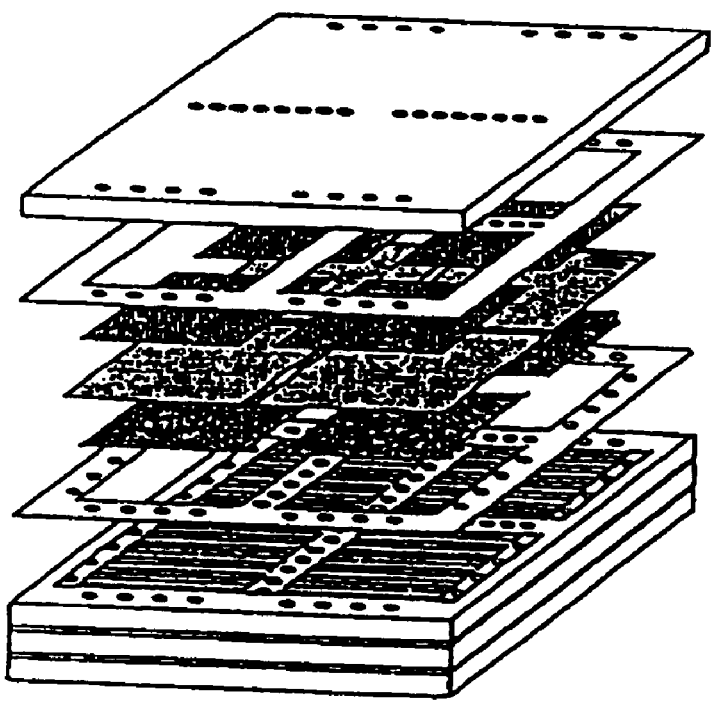

When producing the stack assembling structure, it is important to produce each cell having the same size. The size and height of the bent portion may be reprocessed based on the methods for contacting each single cell with the separating plate and sealing the same. Particularly, when it is intended to produce a stack in a lattice array method by continuously connecting the single cells, the thickness of each single cell and the heights of the bent portion should be same as shown in FIG. 1B.

In the present embodiment of the present invention, in case that the size of the final single cell is about 50×50 mm, the height of the bent corner portion is about 3.5 mm, the inner side height is about 1.8 mm, and the depth of the groove of the gas channel inside the single cell is about 1 mm. The above sizes are determined based on the size of the press mold, the heat treatment and sintering temperatures during the production of the single cell.

In the single cell according to the present invention, a current collecting layer is used for obtaining a uniform gas distribution in an inner side of a channel and an electrical contact. A contact is implemented with the separating plate using a porous metal sheet-shaped felt and a mesh.

EXAMPLE 2

Air Electrode Support Type Single Cell Having Reaction Gas Channels in which Four Sides or Opposite Two Sides of Corners are Downwardly Bent in an Inverted U Shape First, in order to produce the air electrode support, the powder of LSM ($La_{0.85}Sr_{0.15}MnO_3$) is mixed with a spherical graphite powder and is processed by a known press molding and heat treatment for thereby producing a porous air electrode support of about 40%.

The air electrode is produced in the structure of FIGS. 5A through 5D. In the case that the size is about 50×50 mm, the thickness is about 1.7 mm, the height of the downwardly bent corner portion is about 3.5 mm, the height of the inner side is about 1.8 mm, and the width of the bent portion is about 3 mm.

A dense electrolyte layer is formed on the entire portions of the lower surface of the air electrode support. The lower surface of the same is processed by the printing method as the first embodiment of the present invention using the powder formed by mixing NiO powder, 8YSZ ($ZrO_2$+8 mol % $Y_2O_3$) powder and graphite powder of 20% as the fuel electrode component, for thereby producing a SOFC single cell of an air electrode support of FIGS. 5A through 5D.

Particularly, referring to FIGS. 5A through 5D, the reaction gas channels are formed in the straight line structure or the lattice shape structure. At this time, the channel structure may be formed in a trapezoid structure having obtuse and/or acute angles not in the simple right angle structure. In the lattice shape structure, the shape of the protrusion may be rectangular, polygonal and/or circular. The shape of the channel structure may be determined based on the shape of the press mold during the molding operation. Since the remaining description of the same is same as the first embodiment, the detail description thereof is omitted.

EXAMPLE 3

Electrolyte Support Type Single Cell Having Reaction Gas Channels in which Four Sides or Opposite Two Sides of Corners are Downwardly Bent in an Inverted U Shape When the electrolyte support type or self-support type single cell is produced, one or more solid oxide electrolyte powders selected from $ZrO_2$ group, $CeO_2$ group, $Bi_2O_3$ group, and perovskite group are combined together to have the average particle(granule) size of about 10 μm through about 100 μm, and the resultant structure is molded and sintered for thereby obtaining the structure of FIGS. 6A through 6D, for thereby producing the electrolyte plate having the size of 50×50 mm in which the thickness is about 1 mm, the inner side height of the downwardly bent corner is about 2 mm, and the thickness of corners portion is about 1 mm through about 2 mm.

At this time, when molding the source material powder, the width and depth of the groove are about 1 mm through about 0.5 mm based on the shape of the press mold. The straight line shaped channel of FIGS. 6A and 6C, and the lattice shaped channel of FIGS. 6B and 6D may be formed. As described above, in the straight line structure, the channel structure may be formed at an obtuse angle or in an acute angle combined structure, not in a right angle structure. In the lattice shape structure, the shape of the protrusion may be formed in a rectangular shape, a polygonal shape and/or a circular shape.

A fuel electrode paste is produced using a powder formed by mixing NiO powder which is a fuel electrode component 8YSZ($ZrO_2$+8 mol % $Y_2O_3$) powder having a weight % of about 50:50 and a graphite powder as a start source material by a known production method. The above paste is coated or printed on the lower surface of the electrolyte, particularly, in the floor or groove of the reaction gas channel, and then the resultant structure is dried and heat-treated at about 1300° C. through about 1450° C. for thereby forming a fuel electrode. Like in the first embodiment of the present invention, the paste of LSM ($La_{0.8}Sr_{0.2}MnO_3$)+YSZ which is a material of the air electrode is printed, and the resultant structure is dried and heat-treated at about 1100° C. for thereby producing a SOFC single cell of an electrolyte support type or self-support type having a channel structure.

In the fuel cell according to the present invention, it is possible to implement a desired thickness of the separating plate and to decrease a cost in such a manner that the channel structure of the separating plate is simplified during the stacking operation. Therefore, it is possible to stack more single cells in the stack structure in the same size as the conventional art for thereby implementing larger output. The channel is press-formed in the portion corresponding to the support (for example, air electrode, electrolyte, fuel electrode) in which four sides or opposite two sides of corners are downwardly bent in an inverted U shape during the production of the single cell, so that it is not necessary to separately produce the channel in the separating plate for flowing the fuel and air reaction gas.

The present invention is intended to overcome the problems that the production cost of the separating plate is high in the conventional SOFC development. Accordingly to the present invention, a low cost SOFC stack is available.

The present invention is directed to improve the entire construction of the single cell for thereby decreasing the cost of the SOFC stack, and the size of the stack may be decreased using thinner separating plates, As a result, the life span and durability of the system are increased, and an easier operation of the system is obtained.

As the present invention may be embodied in several forms without departing from the concept or essential characteristics thereof, it should also be understood that the above-described examples are not limited by any of the details of the foregoing description, unless otherwise specified, but rather should be construed broadly within its concept and scope as defined in the appended claims, and therefore all changes and modifications that fall within the meets and bounds of the claims, or equivalences of such meets and bounds are therefore intended to be embraced by the appended claims.

What is claimed is:

1. A solid oxide fuel cell defined as a single cell having a fuel electrode, an electrolyte, and an air electrode, wherein four sides or opposite two sides of corners of the single cell are downwardly bent in an inverted U shape, and gas channels are integrally formed in at least one of said fuel electrode, electrolyte and air electrode defining an inner side and/or an outer side of the single cell.

2. The cell according to claim 1, wherein the gas channels are integrally formed in a fuel electrode substrate defining said fuel electrode with a straight-line shaped morphology or a lattice shaped morphology.

3. The cell according to claim 1, wherein a cross morphology of a straight-line shaped or lattice shaped gas channel formed in the fuel electrode substrate of the single cell includes a trapezoid shape in which a rectangular, circular or rectangular protrusion is formed at an obtuse angle.

4. The cell according to claim 1, wherein said single cell has gas channels integrally formed in a porous air electrode substrate defining the air electrode of an inner and/or outer portion of the single cell.

5. The cell according to claim 4, wherein the gas channels are integrally formed in the air electrode substrate with a straight-line shaped morphology or a lattice shaped morphology.

6. The cell according to claim 4, wherein a cross section morphology of straight-line shaped or lattice shaped gas channels formed in the air electrode substrate of the single cell includes a trapezoid shape in which a rectangular, circular or rectangular protrusion is formed at an obtuse angle.

7. The cell according to claim 1, wherein said single cell has gas channels in a dense electrolyte substrate defining the electrolyte of an inner and/or outer portion of said single cell.

8. The cell according to claim 7, wherein the gas channels are integrally formed in said electrolyte substrate in a straight-line shaped morphology or a lattice shaped morphology.

9. The cell according to claim 7, wherein a cross section morphology of straight-line shaped or lattice shaped gas channels formed in the electrolyte substrate of the single cell includes a trapezoid shape in which a rectangular, circular or rectangular protrusion is formed at an obtuse angle.

* * * * *